United States Patent
Tanaka et al.

(10) Patent No.: US 10,266,789 B2
(45) Date of Patent: Apr. 23, 2019

(54) PROCESSING METHOD AND PURIFICATION SYSTEM

(71) Applicant: Hitachi Metals, Ltd., Tokyo (JP)

(72) Inventors: Kotaro Tanaka, Hitachiota (JP); Takumi Sato, Hitachi (JP); Yosuke Watanabe, Hitachi (JP); Mamoru Ohashi, Hitachi (JP); Yukio Kikuchi, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 369 days.

(21) Appl. No.: 15/194,906

(22) Filed: Jun. 28, 2016

(65) Prior Publication Data

US 2017/0044463 A1 Feb. 16, 2017

(30) Foreign Application Priority Data

Aug. 11, 2015 (JP) ................................ 2015-158728

(51) Int. Cl.
*B21C 9/00* (2006.01)
*C10M 175/00* (2006.01)
*B23Q 11/12* (2006.01)
*B23Q 11/10* (2006.01)

(52) U.S. Cl.
CPC ......... *C10M 175/0058* (2013.01); *B21C 9/00* (2013.01); *B23Q 11/1069* (2013.01); *B23Q 11/121* (2013.01); *C10N 2250/02* (2013.01)

(58) Field of Classification Search
CPC ... B21C 1/00; B21C 9/00; B21C 9/02; C10M 175/00; C10M 175/0058; C10M 175/0083; C10N 2250/02; C10N 2250/021; B23Q 11/1069; B23Q 11/121
See application file for complete search history.

(56) References Cited

U.S. PATENT DOCUMENTS

| | | | | |
|---|---|---|---|---|
| 2,084,154 A | * | 6/1937 | Lutz ........................ | B22F 9/04 554/177 |
| 3,618,707 A | * | 11/1971 | Sluhan .............. | B23Q 11/1069 184/109 |
| 3,945,930 A | * | 3/1976 | Sugiyama ........... | C10M 173/00 508/431 |
| 4,535,615 A | * | 8/1985 | Ebben ................. | B01D 17/085 72/39 |

(Continued)

FOREIGN PATENT DOCUMENTS

| | | | | |
|---|---|---|---|---|
| CN | 203602424 U | * | 5/2014 | ............... C02F 9/02 |
| JP | 6-316782 A | * | 11/1994 | ............... C11D 1/83 |

(Continued)

OTHER PUBLICATIONS

Translation, JP 6-316782A, Nov. 1994.*

*Primary Examiner* — Edward T Tolan
(74) *Attorney, Agent, or Firm* — Roberts Mlotkowski Safran Cole & Calderon, P.C.

(57) ABSTRACT

A processing method includes processing a metal wire rod using an emulsion lubricant that includes an oil and a nonionic surfactant at an oil-to-nonionic surfactant ratio of 1:0.3 to 0.9 (in mass ratio). The method may include purifying the emulsion lubricant after being used for processing the metal wire rod while maintaining the oil-to-nonionic surfactant ratio of 1:0.3 to 0.9 (in mass ratio) and then reusing the purified emulsion lubricant to process the metal wire rod.

4 Claims, 1 Drawing Sheet

(56) References Cited

U.S. PATENT DOCUMENTS

| | | | | |
|---|---|---|---|---|
| 5,262,071 A | * | 11/1993 | Tuck | B23Q 11/1046 210/171 |
| 2003/0136424 A1 | * | 7/2003 | Stockert | B08B 3/00 134/10 |

FOREIGN PATENT DOCUMENTS

| | | |
|---|---|---|
| JP | 2001-170708 | 6/2001 |
| JP | 2008-142746 | 6/2008 |
| JP | 2011-218426 | 11/2011 |

* cited by examiner

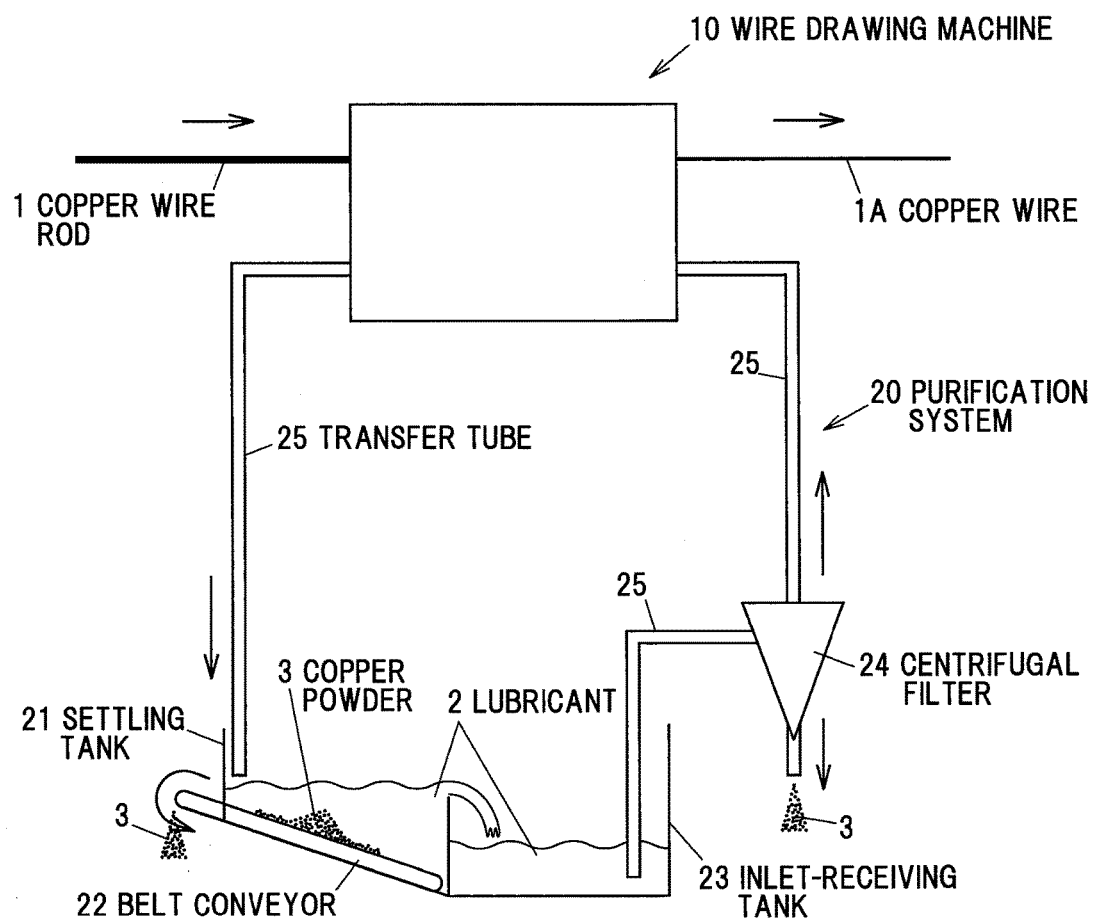

PROCESSING METHOD AND PURIFICATION SYSTEM

The present application is based on Japanese patent application No. 2015-158728 filed on Aug. 11, 2015, the entire contents of which are incorporated herein by reference.

BACKGROUND OF THE INVENTION

1. Held of the Invention

The invention relates to a method of processing a metal wire rod using an emulsion lubricant and a purification system for purifying the emulsion lubricant.

2. Description of the Related Art

Emulsion lubricants are used for e.g. wire drawing of metal wire rods such as copper wire rods.

In general, the emulsion lubricants are formed of a mixture of oil (mineral oil or plant oil) for improving lubricity, a surfactant for dispersing oil into water as well as for providing an effect of cleaning a workpiece, and water. In the emulsion lubricants, oil droplets are finely dispersed in the water by the surfactant.

Contaminants such as a metal powder (e.g., copper powder) produced during processing increase in the emulsion lubricant according as the operating time elapses.

Since the increased contaminants such as metal powder in the emulsion lubricant cause a problem of flaws on the processed surface of the metal wire rod, the emulsion lubricant is purified by removing the contaminants before being used again (see JP-A-2001-170708, JP-A-2008-142746 and JP-A-2011-218426).

JP-A-2001-170708 discloses a method of removing scale from a rolling lubricating oil, in which the first step is settling and removal of metal mill scale which is likely to settle out in an auxiliary tank and the following second step is removal of fine metal mill scale by filtration.

JP-A-2008-142746 discloses a method of drawing a metal wire rod, in which insoluble accumulated unwanted substances (particles of more than 20 μm in size) in an emulsion lubricating liquid is removed by centrifugation with a gravitational acceleration of not less than 30 G and not more than 150 G using a centrifuge and then the emulsion lubricating liquid is returned to a lubricating liquid tank and is reused for the wire drawing process. According to the invention of JP-A-2008-142746, it is possible to prevent separation of water and oil in the lubricating liquid.

JP-A-2011-218426 discloses a lubricating oil purifier which is provided with a centrifuge for removing contaminants in a collected used lubricating oil and a filtration system for removing contaminants present in the lubricating oil after passing though the centrifuge.

SUMMARY OF THE INVENTION

In the method of JP-A-2001-170708, the filtration may be used to remove contaminants such as fine metal powder, it was revealed that 70% of substance removed by the filter (in case of paper filter) was the oil in the emulsion lubricant. On the other hand, the surfactant is likely to pass through the filter. It was found that this eventually results in such a change of the emulsion lubricant that the oil is lost and the surfactant is concentrated.

Based on this, the present inventors considered that the main cause of flaws on the surface of the metal wire rod is that a decrease in the amount of oil in the emulsion lubricant and an excess cleaning effect of the surfactant cause oil film thickness on the processed surface of the workpiece surface to be reduced and lubrication properties to deteriorate, and copper powder, etc., is therefore caught in or burnt on a die.

As such, the emulsion lubricant of which the ratio of lubricant components is changed due to filtration has an effect on processability of wire drawing, etc., and it is therefore necessary to regularly replace the emulsion lubricant.

In the method of JP-A-2008-142746, the centrifugation may be performed with a gravitational acceleration of not less than 30 G and not more than 150 G to remove particles of more than 20 μm in size. However, JP-A-2008-142746 is designed for the wire drawing process of steel wire rod. Therefore, in case of the wire drawing process of copper wire rod to be a raw material of enameled wire, it is necessary to remove contaminants such as copper powder of down to as small as 5 μm so that defects of the enameled wire (e.g., a decrease in insulating performance caused by non-uniform film thickness) is prevented even when flaws are formed on the surface due to copper powder caught in the die during processing. Removal of contaminants having such a small size requires a gravitational acceleration of several hundred to several thousand G and there is therefore a need of improvement to prevent separation of water and oil in the lubricating liquid.

The purifier of JP-A-2011-218426 may have a risk that large contaminants when produced during the process directly get in the centrifuge and block the filter.

In general, centrifugal type filters (hereinafter, referred to as centrifugal filter) is configured that a liquid is put in an inverted conical airtight container at high pressure so as to helically flow along the circumference of the cone toward the apex of the cone, and heavier substances are discharged from an outlet on the apex side of the cone (on the lower side) and lighter substances from an outlet on a bottom side of the cone (on the upper side). Due to this configuration, large contaminants, when mixed, block up the narrow portion of the outlet on the apex side. Even when the outlet on the apex side is blocked, the lubricant still exits from the outlet on the bottom side as usual. This causes a problem that the lubricant returns to a processing machine with the contaminants not removed.

Also, since the purifier of JP-A-2011-218426 may be configured such that the lubricant passes through the filter after passing through the centrifuge, oil is selectively left as a filter residue and this may cause a change in a ratio of components of the lubricant (selective removal of oil) as well as JP-A-2001-170708.

It is an object of the invention to provide a processing method that prevents the surface flaw of wire rod caused by contaminants in an emulsion lubricant during the metal wire rod processing using the emulsion lubricant, as well as a purification system for removing contaminants in the emulsion lubricant while maintaining a mixing ratio of oil to nonionic surfactant in the emulsion lubricant within a predetermined range.

(1) According to an embodiment of the invention, a processing method comprises processing a metal wire rod using an emulsion lubricant that comprises an oil and a nonionic surfactant at an oil-to-nonionic surfactant ratio of 1:0.3 to 0.9 (in mass ratio).

In the above embodiment (1) of the invention, the following modifications and changes can be made.

(i) The method further comprises purifying the emulsion lubricant after being used for processing the metal wire rod while maintaining the oil-to-nonionic surfactant ratio of 1:0.3 to 0.9 (in mass ratio) and then reusing the purified emulsion lubricant to process the metal wire rod.

(ii) The purifying comprises settling and removing contaminants in the emulsion lubricant, and centrifuging after the settling to remove smaller contaminants than the already removed contaminants from the emulsion lubricant using a centrifugal filter.

(iii) The metal wire rod comprises a copper or aluminum material having a diameter of not more than 8 mm.

(iv) The processing comprises a wire drawing.

(2) According to another embodiment of the invention, a purification system comprises:

a settling tank for settling contaminants in an emulsion lubricant that has been used in a processing machine for processing a metal wire rod;

an inlet-receiving tank that receives the emulsion lubricant after the settling of the contaminants; and a centrifugal filter for removing smaller contaminants than the already removed contaminants from the emulsion lubricant that is transferred from the inlet-receiving tank.

In the above embodiment (2) of the invention, the following modifications and changes can be made.

(v) The settling tank comprises a removal system for removing the settled contaminants to outside.

Advantageous Effects of the Invention

According to an embodiment of the invention, a processing method can be provided that prevents the surface flaw of wire rod caused by contaminants in an emulsion lubricant during the metal wire rod processing using the emulsion lubricant, as well as a purification system for removing contaminants in the emulsion lubricant while maintaining a mixing ratio of oil to nonionic surfactant in the emulsion lubricant within a predetermined range.

BRIEF DESCRIPTION OF THE DRAWING

Next, the present invention will be explained in more detail in conjunction with appended drawing, wherein FIG. 1 is an illustration diagram showing an example of a purification system in an embodiment of the present invention.

DETAILED DESCRIPTION OF THE PREFERRED EMBODIMENTS

Method of Processing a Metal Wire Rod

A processing method in the embodiment of the invention includes a step of processing a metal wire rod using an emulsion lubricant which contains oil and a nonionic surfactant at an oil-to-nonionic surfactant ratio of 1:0.3 to 0.9 (mass ratio).

The processing in the embodiment of the invention includes, e.g., wire drawing and rolling, etc. The processing method in the embodiment of the invention is suitable for a wire drawing process particularly when using a die and performing an additional process (e.g., enamel application) after cleaning the surface.

The metal wire rod is not specifically limited but is preferably formed of a copper material or an aluminum material. The copper material may be pure copper or a copper alloy. Likewise, the aluminum material may be pure aluminum or an aluminum alloy.

A diameter of the metal wire rod before processing is preferably not more than 8 mm, more preferably not more than 6.5 mm, further preferably not more than 5 mm, and the most preferably not more than 3 mm. The metal wire rod having such a diameter is drawn down to a diameter of about 0.5 to 1.5 mm and a metal wire is thereby formed. For example, in the wire drawing process, a copper wire rod having a diameter of about 2.6 mm is fed through plural (e.g., four to six) dies to shape into a copper wire of around 1 mm.

A lubricant used for the processing method in the embodiment of the invention is an emulsion lubricant containing oil and a nonionic surfactant at an oil-to-nonionic surfactant ratio of 1:0.3 to 0.9 (mass ratio). By using such an emulsion lubricant, it is possible to prevent surface flaw of wire rod even when contaminants such as copper powder produced during processing are present in the emulsion lubricant.

A content ratio of oil to nonionic surfactant (mass ratio) is preferably oil:nonionic surfactant=1:0.4 to 0.8, more preferably 1:0.45 to 0.75, further preferably 1:0.5 to 0.7.

A content ratio of oil to water (mass ratio) is preferably, e.g., oil:water=40 to 1:60 to 99. The emulsion lubricant is preferably of the oil-in-water type.

The oil which can be used here is any oil applicable to form a lubricant and is, e.g., mineral oil or plant oil.

The surfactant which can be used here is a non-ionic surfactant. Examples of suitable non-ionic surfactant include polyoxyethylene alkyl ether, polyoxyethylene polyoxypropylene glycol and polyoxyethylene sorbitan fatty acid ester.

The emulsion lubricant containing oil and an non-ionic surfactant at the above-mentioned ratio may be prepared by mixing oil and a non-ionic surfactant, which are measured to have the above-mentioned ratio, with water, or may be composed of two or more types of emulsion lubricants having different content ratios which are mixed to have the above-mentioned ratio. Emulsification of oil in water by a non-ionic surfactant can be performed by a general method.

Contaminants (metal powder such as copper powder) in the emulsion lubricant are generally accumulated as the processing proceeds, and such contaminants are desirably removed.

Therefore, in the processing method in the embodiment of the invention, the emulsion lubricant used in the step of processing the metal wire rod desirably undergoes a purification step and is then used in the step of processing the metal wire rod again.

In the purification step, the emulsion lubricant needs to be purified while maintaining the oil-to-nonionic surfactant ratio of 1:0.3 to 0.9 (mass ratio). If the oil-to-nonionic surfactant ratio becomes out of the above-mentioned range due to the purification step, the ratio can be returned back to the above-mentioned range by adding oil or an emulsion lubricant having a high oil content, but this requires mixing work. Therefore, it is desirable to purify by a method capable of maintaining the above-mentioned range without adding anything.

The method capable of maintaining the above-mentioned range is, e.g., a purification process including two steps; a settling step in which contaminants (e.g., contaminants of more than 30 μm in size) in the emulsion lubricant are left to settle and removed; and a centrifugation step in which smaller contaminants (e.g., contaminants of not less than 5 μm and not more than 30 μm in size) than the contaminants removed in the settling step are removed from the emulsion lubricant using a centrifugal filter after the settling step. Such a purification process can be performed by, e.g., a purification system described after.

Centrifugation is characteristic in that heavy substances are generally removed. In case that water and oil are contained, substances discharged from an outlet on the apex side of the cone (on the lower side) are many contaminants and a small amount of water since water is heavier than oil. Thus, even when fine contaminants of down to as small as 5 µm are removed with a large gravitational acceleration of several hundred to several thousand G, oil is not selectively removed so that the lubricity can be maintained during processing such as wire drawing.

By contrast, when using a permeable filter (filtration type), water easily passes therethrough but oil, etc., is likely to remain as a residue on the filter. As a result of analyzing the residual components on the filter, it was found that about 70% was oil, as described above. Sufficient contaminant-removal capability is obtained but oil is removed from the lubricant. Therefore, in the course of the long-term operation, the amount of oil in the lubricant keeps decreasing and the percentage of surfactant component increases accordingly. As a result, an oil film is not kept on the surface of the copper wire rod as a workpiece, and troubles such as drawing or burn of contaminants into/on a die are likely to occur.

Since the emulsion lubricant described above is used in the embodiment of the invention, oil and water are less likely to separate even when centrifugation is performed with a gravitational acceleration of several hundred to several thousand G.

According to the invention, it is possible to manufacture insulated wires through a step of annealing the metal wire obtained by the processing method in the embodiment of the invention and a step of forming an insulation layer around the annealed metal wire. Specifically, the following methods, etc., are applicable as the step of forming an insulation layer: a method in which an insulating coating material formed by dissolving, e.g., a polyamide-imide resin, a polyimide resin or a polyester-imide resin, etc., in an organic solvent is repeatedly applied and cured onto a metal wire to form an insulation layer having a desired thickness; and a method in which a resin composition such as thermoplastic resin is extruded onto a metal wire by an extruder to form an insulation layer having a desired thickness. Insulated wires obtained by such a method have only few flaws on the metal wire. Therefore, it is possible to provide insulated wires in which grains in the insulation layer and uneven thickness of the insulation layer caused by flaws on the surface of the metal wire are reduced.

Purification System

A system for purifying the emulsion lubricant in the embodiment of the invention is provided with a settling tank for settling contaminants in an emulsion lubricant that has been used in a processing machine for processing a metal wire rod, an inlet-receiving tank that receives the emulsion lubricant after the settling of the contaminants, and a centrifugal filter for removing smaller contaminants than the already removed contaminants from the emulsion lubricant that is transferred from the inlet-receiving tank.

FIG. 1 is an illustration diagram showing an example of a purification system in the embodiment of the present invention.

A purification system 20 in the embodiment of the invention shown in FIG. 1 is provided with a settling tank 21 for settling coarse copper powder 3 (e.g., more than 30 µm in size) as contaminants in an emulsion lubricant 2 which has been used for the wire drawing process of a copper wire rod 1 in a wire drawing machine 10, an inlet-receiving tank 23 which receives the emulsion lubricant 2 after the settling of the copper powder 3, and a centrifugal filter 24 for removing smaller copper powder 3 (e.g., not less than 5 µm and not more than 30 µm) than the copper powder 3 settled in the settling tank 21 from the emulsion lubricant 2 which is transferred from the inlet-receiving tank 23.

The settling tank 21 is preferably provided with a removal system for removing the settled copper powder 3 to the outside. A specific example of the removal system is, e.g., a belt conveyor-type removal system which is configured that a belt conveyor 22 is placed on a bottom portion of the settling tank 21, as shown in FIG. 1. A double-door structure, etc., is provided at an outlet to the outside so that the emulsion lubricant 2 does not leak out. However, when it is configured such a manner that the liquid surface in the settling tank 21 is located below the level of the belt conveyor outlet, a special structure for leakage prevention does not need to be provided.

In view of a performance of the centrifuge (the centrifugal filter 24) used in the next step, the settling tank 21 is configured so that the copper powder 3 of more than, e.g., about 30 µm in size settles out. In detail, the settling tank 21 is formed deep enough so that the settled copper powder 3 does not reach the overflow level even when the settled copper powder 3 rises from the bottom due to the flow of the emulsion lubricant 2 from the wire drawing machine 10, and also, the copper powder 3 settled on the bottom of the settling tank 21 is periodically or continuously discharged to the outside of the settling tank 21 by the belt conveyor 22.

The centrifugal filter 24 capable of removing contaminants of down to as small as, e.g., 5 µm is used. The means of removing fine copper powder 3 is not limited to the centrifugal filter 24 and can be, e.g., a filtering device using a cartridge type filter.

Next, a pathway of the emulsion lubricant 2 in the purification process using the purification system 20 will be described.

The emulsion lubricant 2 used for the wire drawing process of the copper wire rod 1 in the wire drawing machine 10 is transferred to the settling tank 21 through a transfer tube 25. Coarse copper powder 3 in the emulsion lubricant 2 settles out during when stored in the settling tank 21 for a while. The settled copper powder 3 is discharged to the outside of the settling tank 21 by the belt conveyor 22.

The supernatant of the emulsion lubricant 2 after the settling of the coarse copper powder 3 overflows into the adjacent inlet-receiving tank 23 and is then sent therefrom to the centrifugal filter 24 through the transfer tube 25.

Since a contaminant removal pipe of the centrifugal filter 24 is likely to be blocked when large contaminants are mixed, large contaminants need to be removed before reaching the centrifugal filter 24. This removal prevents the centrifugal filter 24 from being blocked.

After the fine copper powder 3 is removed by the centrifugal filter 24, the lubricant 2 returns to the wire drawing machine 10 through the transfer tube 25.

Since the purification system in the embodiment of the invention can prevent oil in the lubricant from being selectively removed in large amounts, it is possible to perform removal of contaminants from the emulsion lubricant for a long period of time while maintaining a mixing ratio of oil to nonionic surfactant in the emulsion lubricant within a predetermined range. Therefore, it is possible to provide a longer periodic lubricant replacement cycle.

Example

The invention will be further specifically described below in reference to Example. However, Example is not intended to limit the invention in any way.

Example and Comparative Example

The purification system shown in FIG. 1 was prepared as Example. Meanwhile, a purification system having a configuration described in previously mentioned JP-A 2001-170708 (using a paper filter) was prepared as Comparative Example. The purification systems were constantly operated during when the wire drawing machine was in operation, and a lubricant was circulated at a rate of 500 L/min.

The emulsion lubricant was prepared by mixing several types of commercially-available lubricants having different non-ionic surfactant-to-oil component ratios (mass ratio) so that the emulsion lubricant had the non-ionic surfactant-to-oil component ratio (mass ratio) of 0.2. The component ratio (mass ratio) was derived based on the results of organic composition analysis using NMR (nuclear magnetic resonance method).

The purification system in Example was operated such that the copper powder 3 settled on the bottom of the settling tank 21 was discharged by the belt conveyor 22 once a day. In addition, a partition wall between the settling tank 21 and the inlet-receiving tank 23 was adjusted to such a height that, even when the copper powder 3 settled near the partition wall rose from the bottom, copper power of more than about 30 μm in size did not reach the overflow level (the height in this example was 1 meter). In the centrifugal filter 24, fine copper powder 3 of down to as small as 5 μm was removed with a gravitational acceleration of 1500 G.

The wire drawing machine used here was a machine which shapes a φ1.3-mm copper wire rod into a φ0.8-mm copper wire via a die 4.

An eddy current flaw detector was placed in the wire drawing machine to count the number of flaws on the respective surfaces of the undrawn φ1.3-mm copper wire rod and the drawn φ0.8-mm copper wire. In detail, in case that a flaw was detected on the undrawn φ1.3-mm copper wire rod and was then detected at the same position on the drawn φ0.8-mm copper wire, the flaw was not caused by the wire drawing machine and was thus not counted. On the other hand, in case that a flaw was not detected on the undrawn φ1.3-mm copper wire rod but was detected at the same detection position on the drawn φ0.8-mm copper wire, the flaw was caused by the wire drawing machine and was thus counted. The number of flaws per 5000 meter of the copper wire was counted. The acceptability criterion was a flaw occurrence rate, i.e., a defect occurrence rate of not more than 3.5 flaws per 5000 meter. The results are shown in Table 1.

Meanwhile, a non-ionic surfactant-to-oil component ratio (mass ratio) in the emulsion lubricant was derived based on the results of organic composition analysis using NMR (nuclear magnetic resonance method). The results are shown in Table 1.

Calculations of the flaw occurrence and the component ratio were carried out immediately after replacing with an unused brand-new emulsion lubricant, immediately after 48 hours of running-in, and after 6 months and 1 year of normal operation (after running-in) of the wire drawing machine and purification system in Example, and only after 6 months of normal operation (after running-in) of the wire drawing machine and purification system in Comparative Example. The sharp increase in the component ratio (mass ratio) after running-in is caused by being mixed with a small amount of used liquid left at the time of replacement or with residual liquid in the pipe. Here, running-in means that the wire drawing machine and the purification system are operated while circulating and stirring the lubricant without moving the copper wire rod, i.e., without performing the wire drawing process.

TABLE 1

| | | Component ratio (mass ratio) (non-ionic surfactant/oil) | Defect (flaw) occurrence rate (number of flaws/5000 m) |
|---|---|---|---|
| Example | Immediately after replacing with unused brand-new lubricant | 0.197 | many |
| | After running-in | 0.510 | 0.98 |
| | After 6 months of normal operation | 0.730 | 2.57 |
| | After 1 year of normal operation | 0.905 | 3.50 |
| Comparative Example: After 6 months of normal operation | | 0.936 | 4.59 |

When the same test was conducted using an emulsion lubricant having a non-ionic surfactant-to-oil component ratio (mass ratio) of 0.55 and containing copper power in an amount of 238 mg/L, the defect (flaw) occurrence rate was 1.5/5000 m. Meanwhile, the copper powder contained in the emulsion lubricant (after 6 months of normal operation) in Comparative Example shown in Table 1 was 119 mg/L. This shows that the non-ionic surfactant-to-oil component ratio (mass ratio) in the lubricant has a larger impact on the defect occurrence rate than the amount of copper powder in the lubricant.

The invention is not limited to the embodiment and Example and various modification can be implemented.

What is claimed is:

1. A processing method comprising:
   drawing a metal wire down to a diameter of 0.5 to 1.5 mm in a wire drawing machine, by using an emulsion lubricant comprising an oil and a nonionic surfactant at an oil-to-nonionic surfactant ratio of 1:0.3 to 0.9 in mass ratio;
   purifying the emulsion lubricant after being used for drawing the metal wire while maintaining the oil-to-nonionic surfactant ratio of 1:0.3 to 0.9 (in mass ratio) to be free of a copper powder of not less than 5 μm, the purifying comprising settling and removing the copper powder of not less than 30 μm in size in the emulsion lubricant used to drawing the metal wire, and successively centrifuging to remove smaller copper powder than the already removed copper powder from the emulsion lubricant using a centrifugal filter; and
   returning the purified emulsion lubricant to the wire drawing machine.

2. The method according to claim 1, wherein the metal wire rod comprises a copper or aluminum material having a diameter of not more than 8 mm.

3. A purification system, comprising:
   a settling tank for settling copper powder in an emulsion lubricant that has been used in a wire drawing machine for drawing a metal wire down to a diameter of 0.5 to 1.5 mm, the emulsion lubricant comprising an oil and a nonionic surfactant at an oil-to-nonionic surfactant ratio of 1:0.3 to 0.9 in mass ratio, the settling tank settling and removing the copper powder of not less than 30 μm in size;
   an inlet-receiving tank that receives the emulsion lubricant after the settling of the copper powder of not less than 30 μm in size; and a centrifugal filter for removing smaller copper powder than the already removed copper powder from the emulsion lubricant that is transferred from the inlet-receiving tank, the smaller copper powder being not less than 5 μm, wherein the purification system maintains the oil-to-nonionic surfactant ratio of 1:0.3 to 0.9 (in mass ratio) after the emulsion lubricant passes through the centrifugal filter.

4. The purification system according to claim 3, wherein the settling tank comprises a removal system for removing the settled copper powder to outside.

\* \* \* \* \*